United States Patent [19]

Diggins

[11] Patent Number: 4,489,492
[45] Date of Patent: Dec. 25, 1984

[54] NIBBLING TOOL FOR SHEARING SHEET MATERIAL

[76] Inventor: James R. Diggins, 37 W. Common, Lindfield, Sussex RH 16 1AJ, England

[21] Appl. No.: 383,864

[22] Filed: Jun. 1, 1982

[30] Foreign Application Priority Data

Jun. 5, 1981 [GB] United Kingdom ................ 8117203

[51] Int. Cl.³ .................................. B26B 13/00
[52] U.S. Cl. ........................................ 30/241; 83/916
[58] Field of Search ................... 30/241–243, 30/228, 500; 83/916, 926 H, 699, 527

[56] References Cited

U.S. PATENT DOCUMENTS 2,631,370  3/1953  Gray .................................... 30/241
2,632,950  3/1953  Hedstrom ............................ 30/241

Primary Examiner—Donald R. Schran
Assistant Examiner—Douglas D. Watts
Attorney, Agent, or Firm—Karl W. Flocks; Sheridan Neimark; A. Fred Starobin

[57] ABSTRACT

A nibbling tool for sheet material e.g. metal or plastics material and attachment to a power tool e.g. air or electric drill or air motor is disclosed. The structure of the tool permits a positive and easy change to be effected in respect of the cutting direction e.g. from the axial direction of the tool (for planar sheet) to a lateral direction for corrugated or contoured sheet. This change is effected by releasing a locking member externally of the housing and does not entail stripping down the tool. Likewise provision is made for a simple adjustment to optimize the stroke of the punch relative to the die.

5 Claims, 15 Drawing Figures

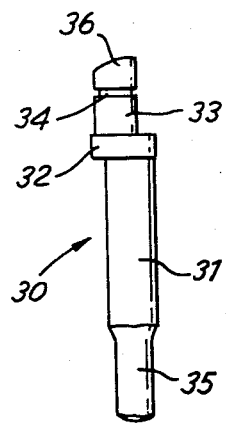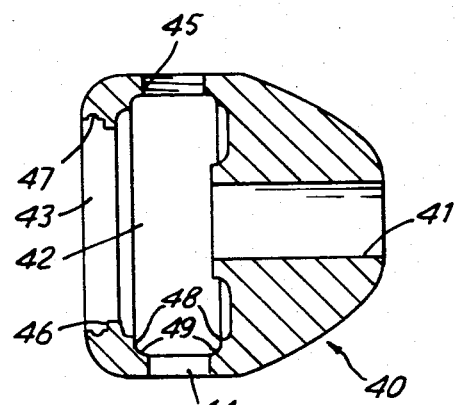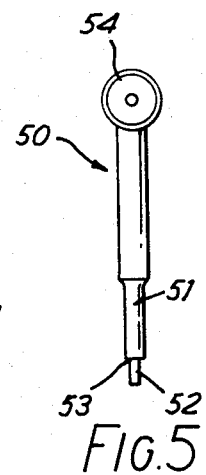
FIG.3  FIG.4  FIG.5
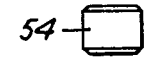
FIG.3A  FIG.5A
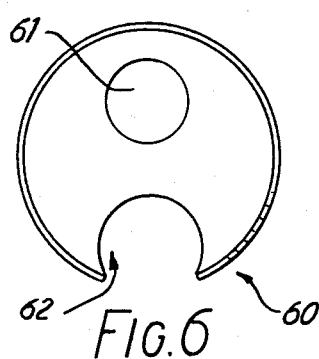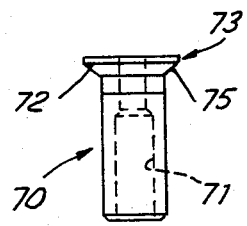
FIG.6  FIG.7
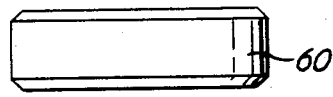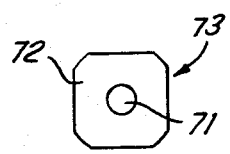
FIG.6A  FIG.7A

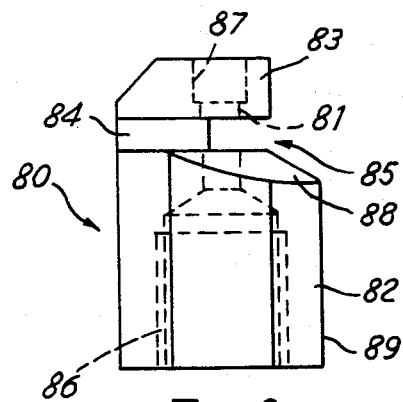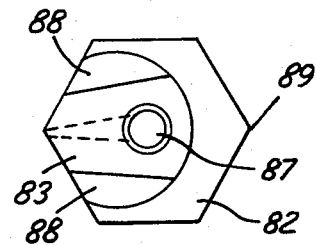
FIG. 8  FIG. 8A
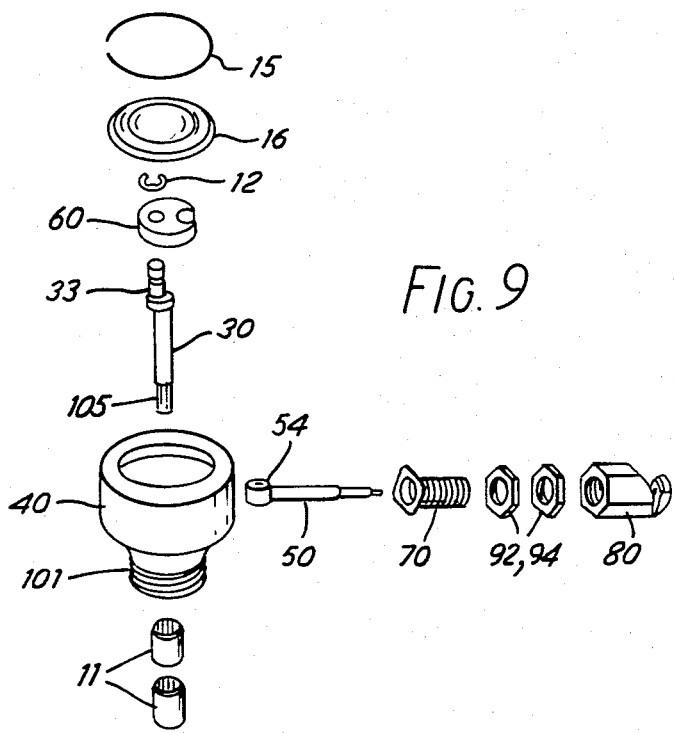
FIG. 9

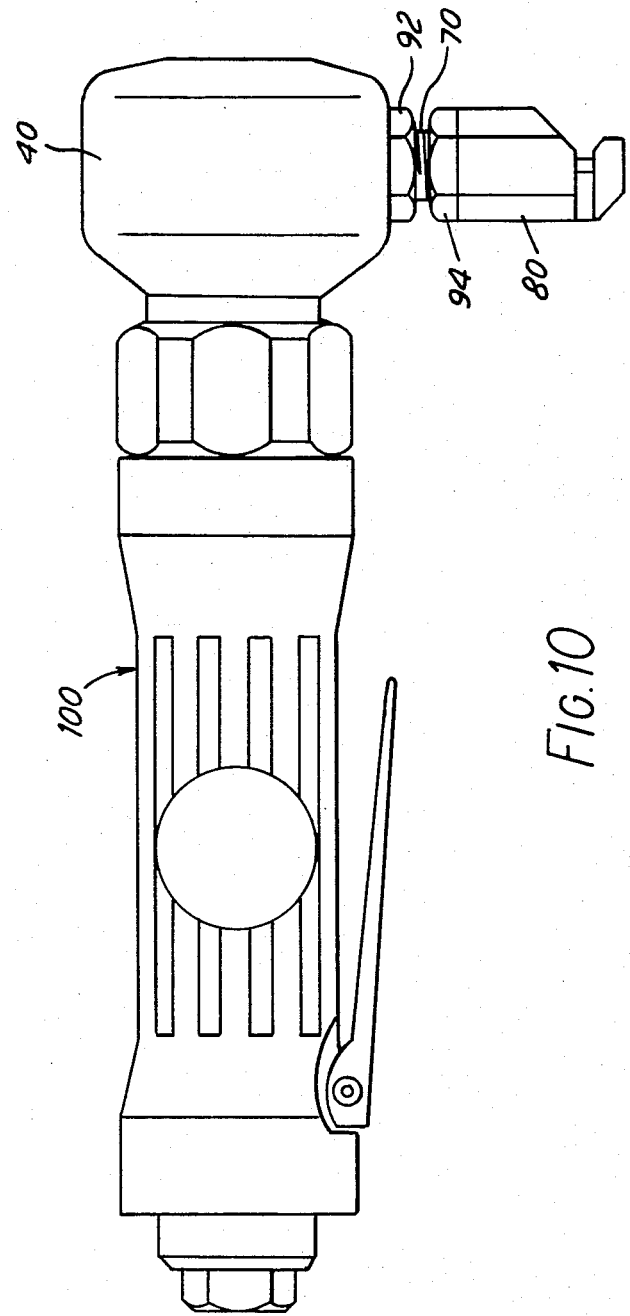

NIBBLING TOOL FOR SHEARING SHEET MATERIAL

This invention relates to a nibbling tool for shearing sheet material and more particularly to such a tool as an attachment to an external drive mechanism.

In the past because the main users were industrial organisations, nibbling tools were often supplied as nibbling machines with their own drive mechanisms, i.e. the machine incorporated a motor.

A prior art nibbling machine is disclosed in United Kingdom patent specification No. 1,485,795. This patent specification explains that the punch may be arranged concentrically relative to the piston or in an eccentric position relative thereto, and opts for the latter arrangement. In consequence, in order to reset the cutting direction of that tool it is necessary both to rotate a die carrying member through, say, 90° and to rotate the piston itself through 90°. The specification is particularly concerned with providing a form of coupling between a rotary shaft and a reciprocating piston carrying the punch which permits the piston to be rotated when the die carrying member is rotated. The structure of the tool in relation to the manner in which the die carrying member is mounted and may be reset to change the cutting direction, follows and depends from the structural design features necessary to provide for rotation of the piston. Furthermore, the engineering concepts behind such a machine are related to its production as a complete machine for the industrial user and not related to the concept of an attachment for marketing for use with power tools e.g. electric drills, air drills or even air motors which are widely used in motor repair workshops.

The prior art patent specification does explain how the punch may be configured, and the die located, according to whether shearing is to be accomplished on the advance or return piston stroke of the piston member of the nibbling machine.

The significance of the nibbling tool as an attachment has been previously appreciated and a tool marketed which has different characteristics from those of the nibbling machine disclosed in the aforementioned patent specification.

This known nibbling tool (hereinafter referred to as 'the type hereinbefore defined') comprises a shaft to be driven by an external drive mechanism, a housing in which said shaft is rotatably mounted to extend externally of the housing for connection to a said external drive mechanism, a piston member, a punch mounted on the piston member, and a pin-extension of the piston member, said punch and pin-extension being coaxial with the piston member, coupling means within said housing for coupling said shaft with said piston member to translate rotation of said shaft into reciprocation of said piston member, a piston guide piece with a passage therein for the piston member, a housing aperture in said housing through which housing aperture said piston guide piece projects externally of said housing, a head portion on said piston guide piece for co-operating with said housing internally thereof to prevent thereby rotation of the piston guide piece, a die carrying member including a die for co-operation with said punch to shear sheet material said die carrying member having a first portion mounted on said piston guide piece and a second portion spaced from said first portion by an intermediate spacer portion thereof, said intermediate spacer portion defining the cutting region of the tool in which sheet material to be sheared is entered between said first and second portions of the die carrying member, said first and second portions having passages therein for the travel therein of the piston member and the punch respectively.

The known tool has a two part housing, the parts being held together by fastenings, e.g. bolts. The position of the head section of the piston guide member may only be altered by taking the housing apart, lifting the head section out of a recess therein in which it cannot be rotated, and re-assembling the tool. This operation has to be performed on each occasion it is desired to change the cutting direction of the tool. In practice the cutting direction will be parallel to the shaft or at right angles thereto. Another characteristic of this known attachment tool is that the piston guide member and the die carrying member are unitary. Thus once the tool is assembled there is no provision for adjusting the stroke of the punch relative to the cutting region. This adjustment is critical to the performance of the tool. In addition, the die carrying member is cylindrical.

The present invention seeks to provide an improved nibbling tool of the type hereinbefore defined which affords the possibility of a simple adjustment of the cutting direction without necessitating access internally of the housing. It is further sought to provide an embodiment in which the stroke of the piston member is adjustable.

According to the present invention there is provided a nibbling tool of the type hereinbefore defined for shearing sheet material and for attachment to an external drive mechanism characterised in that there is provided a first locking member arranged externally of the housing and adapted to releasably lock said piston guide member axially relative to said housing, abutment means internally of the housing and juxtaposed with said housing aperture, said abutment means co-operating with said head section of the piston guide member to prevent rotation thereof when said first locking member secures the axial position of said piston guide member, the arrangement affording provision to reset the cutting direction of the tool, said resetting being accomplished by releasing the locking member to permit axial movement of the piston guide member, displacing the piston guide member axially inwardly of the housing to an extent such that the head section may be rotated to thereby rotate the die carrying member to another cutting position, axially returning the piston guide member to its initial axial position relative to the housing, and again locking the axial position of the piston guide member relative to the housing by means of said first locking member.

This nibbling tool affords simple and easy adjustment of the cutting direction between given positions e.g. longitudinally of the body of a drill to which it is attached for normal usage and at right angles thereto when shearing corrugated or contoured sheet metal.

As will be illustrated the external drive mechanism may be an electric drill, an air drill or an air motor. The die carrying member will be contoured in known manner in the vicinity of the cutting region to maximise the freedom of movement of the tool relative to the surface of sheet material being sheared.

As is conventional, since the intermediate portion of the die carrying member follows along the recess or channel cut by the punch, the maximum relevant dimension thereof does not exceed the diameter of the punch.

Embodiments of the invention will now be described, by way of example only, with reference to the accompanying drawings in which:

FIGS. 3 and 3A show an elevational view and plan view of the shaft of the nibbling tool of FIG. 1;

FIG. 4 shows a sectional view of the housing of the nibbling tool of FIG. 1.

FIGS. 5 and 5A show an elevational view and part plan view of the piston member of the nibbling tool of FIG. 1;

FIGS. 6 and 6A show a plan view and elevational view of a coupling member of the nibbling tool of FIG. 1;

FIGS. 7 and 7A show an elevational view and a plan view of a piston guide member of the nibbling tool of FIG. 1;

FIGS. 8 and 8A show an elevational view and a plan view of a die carrying member of the nibbling tool of FIG. 1;

FIG. 9 shows an exploded view of the parts of a nibbling tool similar to that of FIG. 1 but modified for use with an air motor; and, FIG. 10 shows the assembled nibbling tool of FIG. 9 in combination with an air motor.

Figure 1:
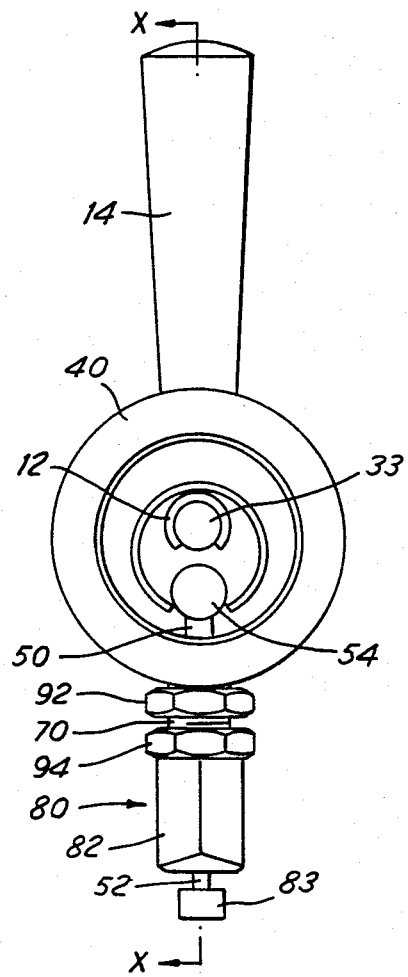
FIG. 1 shows an elevation of a nibbling tool according to a first embodiment with the closure member shown in FIG. 2 removed.
Figure 2:
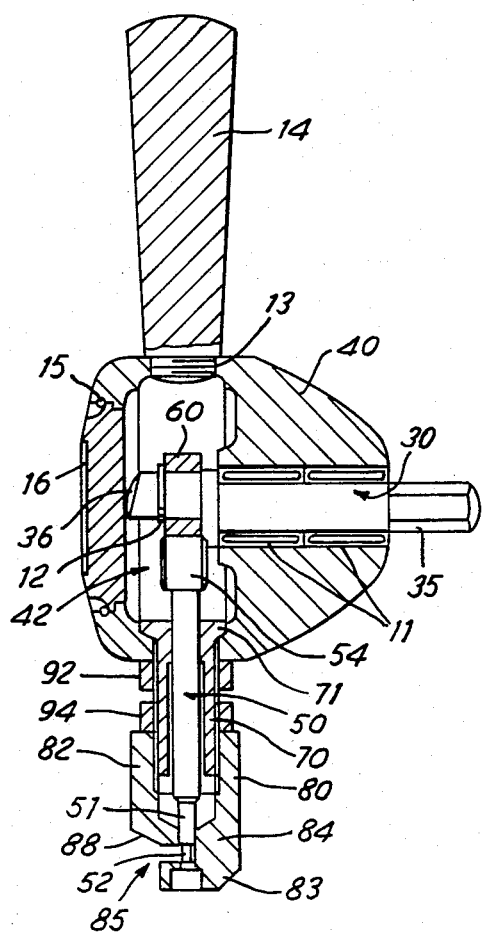
FIG. 2 shows a sectional view taken on the line X—X of FIG. 1.

In FIGS. 1 and 2 of the drawings there is shown a nibbling tool for shearing sheet material such as sheet metal or plastics material and for attachment to an external drive mechanism. The design affords simplicity of manufacture of the components, which are separately illustrated in FIGS. 3 to 8, and facilitates the assembly of these components as well as the ease of maintenance including the replacement of a worn punch.

A shaft 30, which is shown separately in FIGS. 3, 3A, is arranged to be driven by an external drive mechanism, such as an air drill or electric drill. This shaft 30 is rotatably mounted to extend externally of a housing 20 for connection to the external drive mechanism. As shown in FIGS. 3, 3A, the shaft 30 has a main portion 31, which is journalled by means of roller bearings 11 (FIG. 2), a crank portion 32 with a crank shaft portion 33 thereon eccentrically disposed (as shown in FIG. 3A) in relation to the main portion 31 and having a groove 34 to receive the clip 12 (FIG. 1). The end portion 35 of the shaft 30, which is remote from the crank shaft 33, is formed with a hexagonal section in this embodiment. It is this end portion 35 which extends externally of the housing 40 (FIG. 1) for connection to the external drive mechanism. The portion 35 with its hexagonal section is adapted to be received in the chuck of a drill. End face 36 is chamfered to reduce the area of contact with closure member 16 (see below).

The housing 40, which is shown separately in FIG. 4, is machined from solid metal. It has a passage 41 for the roller bearings 11 in which the shaft 30 is journalled. A main cavity 42 is machined from the end 43 and apertures 44,45 are formed orthogonally to the direction of passage 41. The housing 40 is rotationally symmetrical save that aperture 45 is threaded to receive handle 14 with its threaded inner end 13. The cavity 42 is formed at 46 to receive a circular closure member 16 (FIG. 1) retained by a circlip 15 for which a retention groove 47 is provided.

A piston member 50 is shown separately in FIGS. 5,5A. Piston member 50 has a cylindrical punch 51 mounted thereon and a pin extension member 52. The punch 51 of this embodiment, which is adapted to shear metal on the forward stroke of the piston member 50, has a cutting edge 53. Both the punch 51 and pin extension 52 are coaxial with the piston member 50 and for this arrangement the pin extension 52 projects beyond the punch 51. At one end of the piston member 50, remote from the pin extension 52 (FIG. 5A), a coupling member 54 is secured to the piston member 50.

Coupling member 54, which is a disc-like member arranged with its axis orthogonal to the longitudinal axis of the piston member 50, co-operates with a second coupling member 60 (FIG. 6) to form coupling means. The coupling means (54, 60) as shown in FIGS. 1 and 2 are arranged within the housing 40 for the purpose of coupling the shaft 30 with the piston member 50 to translate rotation of the shaft 30 into reciprocation of the piston member 50. The second coupling member 60 is substantially cylindrical and has an eccentrically disposed aperture 61 whereby it is mounted on the crank shaft 33, and a part circular recess 62 which accommodates the coupling member 54. The depth of the coupling member 60 (FIG. 6A) matches that of the coupling member 54 (FIG. 5A) and the axial length of the crank shaft 33 between the crank 32 and the groove 34. Circlip 12, when seated in groove 34 (FIG. 1), retains coupling member 60 on crank shaft 33. Since member 60 has freedom of movement to oscillate about crank shaft 33 which is eccentrically disposed relative to main shaft portion 32, and coupling member 54 is free to oscillate within recess 62, rotary movement of shaft 30 results in reciprocation of piston member 50.

A piston guide piece 70, which is shown separately in FIGS. 7,7A, has a passage 71 therein for the piston member 50. The piston guide piece 70 is dimensioned to be received within the cavity 42 of the housing 40 so as to then be axially displaced through the housing aperture 44 (FIG. 4) and thereby extend externally of the housing 40 (FIG. 2). A head portion 72 on the piston guide piece 70 cooperates with the housing 40 within the cavity 42 to prevent thereby rotation of the piston guide piece 70.

A die carrying member 80 is shown separately in FIGS. 8 and 8A. This die carrying member 80 includes a die 81 for co-operation with the punch 51 to shear sheet metal. It has a first portion 82 for mounting on the piston guide piece 70 (as shown in FIG. 2) and the second portion 83 spaced from the first portion 82 by an intermediate spacer portion 84. Spacer portion 84 determines the cutting region 85 of the tool in which sheet metal to be sheared is entered between the first and second portions 82, 83. The first and second portions 82, 83 have passages 86,87 therein for the travel of the piston member 50, punch 51 and pin extension 52 respectively (See FIG. 2). In this embodiment, the punch 51 is only intended to project sufficiently to co-operate with the leading cutting edge of die 81 to shear metal. Nevertheless, the passage 87 is dimensioned at the die 81 to accommodate the punch 51 should its travel exceed the leading edge of the die 81. Passage 87 is enlarged upwardly of die 81 (FIG. 8) for the egress of swarf during shearing operations.

During shearing operations the punch 51 reciprocates through the cutting region 85 and in co-operation with die 81 on each stroke removes a segment of the sheet metal. The pin extension 52 acts as a stop for the sheet metal during that portion of the stroke of the piston member 50 when the punch 51 is free of the metal. The spacer portion 84 of the die carrying member 80 is dimensioned in its relevant dimension such that it does not exceed the diameter of the punch 51 since it passes along that channel or recess cut by the punch 51 in the sheet metal or plastics material.

Die carrying member 80 is contoured at 88 in the vicinity of the cutting region 85 to maximise the freedom of movement of the tool relative to the surface of the sheet metal or plastics material being sheared.

In FIGS. 1 and 2 there is shown a first locking member 92 which is arranged externally of the housing 40 and which is adapted to releasably lock the piston guide member 70 axially relative to the housing 40. In this embodiment member 70 is externally threaded and first locking member 92 is a nut member which threadedly engages therewith and is capable of being positioned in abutment with an external face 47 of the housing 40. With the head section 71 of member 70 seated in the housing 40, the piston guide piece 70 is thus secured. As shown in FIG. 4, abutment means 48 are located within the housing 40 and juxtaposed with the housing aperture 44. These abutment means 48 co-operate with the head section 71 of the piston guide member 70 to prevent rotation thereof when the locking member 92 secures the axial position of piston guide member 70. Abutment means 48 co-operate with the sides 73 of the head section 71 (FIG. 7).

The arrangement affords provision to reset the cutting direction of the tool. Usually for normal use on planar sheets of material the tool will be arranged as shown in FIGS. 1 and 2, that is with the cutting region directed forwardly i.e. in the forward axial direction of the shaft 30 (which will also be the forward direction of a power drill connected to the shaft). For cutting or shearing corrugated or non-planar sheet, it is necessary to arrange for the cutting direction to be at right angles to that shown in FIG. 2. Resetting from the FIG. 2 position is accomplished by releasing the locking member 92 to permit axial movement of the piston guide member 70. The piston guide member 70 may be then displaced axially inwardly of the housing 40 (i.e. further into the cavity 42). It will be noted that the arrangement of the coupling means (54,60) within the cavity 42 permit this movement to occur without interference with these components. The displacement need occur only to the extent that the head section 71 may be rotated or turned through a quarter turn to thereby rotate the die carrying member 80 to another cutting position - the sense of rotation may be in either direction depending on the preference of the person using the tool. The piston guide member 70 is axially returned to its initial axial position relative to the housing 40. This axial position is then again secured by means of locking member 92. Such resetting is readily accomplished in a simple manner and does not require access to the interior of the housing 40.

It is an advantageous feature of this embodiment that the die carrying member 80 is adjustably mounted on the piston guide piece 70; the portion 82 of member 80 is internally threaded for threaded engagement with guide piece 70. This allows the intermediate spacer portion 84 of the die carrying member 80 to be positioned to optimise the stroke of the punch 51 relative to the die 81. For optimum results, the punch 51 on the forward stroke of the piston member 50, just reaches the die 81. If it overtravels then the speed of the punch 81 during the shearing action may be too high and vibration and overheating may result. Oil is employed to lubricate the shearing metal and punch. Overheating gives rise to fumes. If the punch under travels, then the shearing action may be impaired. A second locking member 94 is provided for releasably locking the adjusted position of the die carrying member 80 on the piston guide piece 70. In this embodiment this locking member 94 is also a locking nut internally threaded to engage the threaded portion of guide piece 70 and secure the member 80 by abutment therewith after member 80 has been brought to the correct position. In this manner after the initial adjustment of the punch stroke relative to the die 81, the adjustment necessary to change the cutting direction may be made without that adjustment resulting in the need to make a further adjustment of the piston stroke.

Advantageously, a first seating surface 49 (FIG. 4) is located internally of the housing 40 and around the housing aperture 44, and a second seating surface 75 is formed on the surface of the head section 71 of the piston guide member 70 which contacts the housing 40. As illustrated these surfaces 49,75 have complementary spherical curvatures. The surfaces 49,75 are in direct load bearing contact in the assembled tool (FIG. 2). This eliminates vibration of the guide piece 70.

These surfaces 49,75 withstand the hammering action of the tool and enable the tool to maintain the die height in both cutting positions. In addition, the contour of the internal seating combined with the illustrated outer surface make for a rigid and strong casing at the aperture 44.

As shown in FIG. 8, the die carrying member 80 has an hexagonal cross-section over the first portion 82 thereof. One axially extending edge 89 thereof is so aligned with the intermediate spacer portion 84 as to always be directed in the cutting direction of the tool. This edge 89 also acts as a cutting direction indicator for the user when cutting material, since the material itself obscures the cutting region. This feature is also useful when adjusting the piston stroke, as for this purpose the member 80 is rotated about the guide piece 70 and the user has an indicator in view as to the cutting direction of the member 80. In this embodiment the head section 71 (FIG. 7A) of the piston guide piece 70 is square. One position of the head section 71 in abutment with the abutment means 48 (FIG. 4) corresponds to the axially extending edge 89 being directed forwardly in the axial direction of the shaft 30. Rotation of the head section 71 through a right angle corresponds to the axially extending edge 89 being directed laterally of the shaft direction for sideways cutting movement of the tool relative to the shaft direction.

The nibbling tool above described has the shaft 30 adapted at the end portion 35 for connection to a drill with a chuck. As shown in FIG. 9 (in which the parts are shown in exploded view), the end portion 35 may be splined for connection to an air motor. The housing 40 in FIG. 9 is adapted at 101 for threaded engagement with the body of an air motor 100. The combination of the tool of FIG. 9 and an air motor 100 are shown in FIG. 10.

Referring to FIG. 2, it may be noted that the closure member 16 acts as a thrust plate and when removed (by taking out the circlip 15) this allows the shaft 30 and piston member 50 to be removed. The latter can thus be easily removed and replaced when a new punch 51 is required. Similarly, die carrying member 80 may be readily exchanged for a new part, when die 81 requires replacement.

I claim:

1. A nibbling tool for shearing sheet material and for attachment to an external drive mechanism, comprising:
   a shaft to be driven by an external drive mechanism,
   a housing in which said shaft is rotatably mounted to extend externally of the housing for connection to a said external drive mechanism,
   a piston member, a punch mounted on the piston member, and a pin extension of the punch member, said punch and pin-extension being coaxial with the piston member,
   coupling means within said housing for coupling said shaft with said piston member to translate rotation of said shaft into reciprocation of said piston member,
   a piston guide piece with a passage therein for the piston member, a housing aperture in said housing through which housing aperture said piston guide piece projects externally of said housing,
   a head portion on said piston guide piece for co-operating with said housing internally thereof to prevent thereby rotation of the piston guide piece,
   a die carrying member including a die for cooperation with said punch to shear sheet material
   said die carrying member having a first portion and a second portion spaced from said first portion by an intermediate spacer portion thereof,
   and mounting means mounting said first portion on the piston guide piece,
   said intermediate spacer portion defining the cutting region of the tool in which sheet material sheared is entered between said first and second portions of the die carrying member,
   said first and second portions having passages therein for the travel therein of the piston member and the punch respectively, wherein there is provided a first locking member arranged externally of the housing and adapted to releasably lock said piston guide member axially relative to said housing,
   abutment means internally of the housing and juxtaposed with said housing aperture, said abutment means co-operating with said head section of the piston guide member to prevent rotation thereof when said first locking member secures the axial position of said piston guide member, the arrangement affording provision to reset the cutting direction of the tool, said resetting being accomplished by releasing the locking member to permit axial movement of the piston guide member, displacing the piston guide member axially inwardly of the housing to an extent such that the head section may be rotated to thereby rotate the die carrying member to another cutting position, axially returning the piston guide member to its initial axial position relative to the housing, and again locking the axial position of the piston guide member relative to the housing by means of said first locking member,
   and wherein a first seating surface of spherical curvature is located internally of the housing and around said housing aperture, and a second seating surface of spherical curvature is formed on the piston guide member, whereby the first and second seating surfaces are in direct load bearing contact in the assembled tool.

2. A nibbling tool as claimed in claim 1, wherein said die carrying member is adjustably mounted on said piston guide piece, whereby the intermediate spacer portion of the die carrying member may be positioned to optimise the stroke of the punch relative to the die.

3. A nibbling tool as claimed in claim 2, further comprising a second locking member for releasably locking said die carrying member on said piston guide piece.

4. A nibbling tool as claimed in any one of claims 1, 2 or 3 wherein the die carrying member is polygonal in cross-section over the first portion thereof and one axially extending edge is so aligned with said intermediate portion as to always be directed in the cutting direction of the tool, and to provide a cutting direction indicator.

5. A nibbling tool as claimed in claim 4, wherein the head section of the piston guide piece is square, and whereby one position of the head section in abutment with said abutment means corresponds to said axially extending edge being directed forwardly in the axial direction of the shaft, and rotation of the head section through a right angle corresponds to said axially extending edge being directed laterally of the shaft direction for sideways cutting movement of the tool relative to the shaft direction.

* * * * *